(12) United States Patent
Ceder et al.

(10) Patent No.: US 9,172,090 B2
(45) Date of Patent: Oct. 27, 2015

(54) ELECTROCHEMICAL DEVICE COMPRISING LITHIUM MANGANESE BORATE COMPOUNDS

(75) Inventors: Gerbrand Ceder, Wellesley, MA (US); Jae Chul Kim, Cambridge, MA (US); ByoungWoo Kang, Cambridge, MA (US); Charles J. Moore, Cambridge, MA (US); Geoffroy Hautier, Somerville, MA (US)

(73) Assignee: Massachusetts Institute of Technoloy, Cambridge, MA (US)

( * ) Notice: Subject to any disclaimer, the term of this patent is extended or adjusted under 35 U.S.C. 154(b) by 208 days.

(21) Appl. No.: 13/643,971

(22) PCT Filed: May 5, 2011

(86) PCT No.: PCT/US2011/035342
§ 371 (c)(1),
(2), (4) Date: Jan. 9, 2013

(87) PCT Pub. No.: WO2011/140327
PCT Pub. Date: Nov. 10, 2011

(65) Prior Publication Data
US 2013/0099174 A1    Apr. 25, 2013

Related U.S. Application Data (60) Provisional application No. 61/332,502, filed on May 7, 2010.

(51) Int. Cl.

| | |
|---|---|
| *H01M 4/06* | (2006.01) |
| *H01M 4/13* | (2010.01) |
| *H01M 4/14* | (2006.01) |
| *H01M 4/24* | (2006.01) |
| *H01M 4/36* | (2006.01) |
| *H01B 1/08* | (2006.01) |
| *C01G 45/12* | (2006.01) |
| *H01M 4/58* | (2010.01) |
| *C01B 35/12* | (2006.01) |
| *H01M 4/136* | (2010.01) |
| *H01M 10/0525* | (2010.01) |

(52) U.S. Cl.
CPC ........... *H01M 4/5825* (2013.01); *C01B 35/121* (2013.01); *C01B 35/128* (2013.01); *H01M 4/136* (2013.01); *H01M 10/0525* (2013.01); *Y02E 60/122* (2013.01); *Y02T 10/7011* (2013.01)

(58) Field of Classification Search
CPC ........... H01M 4/06; H01M 4/13; H01M 4/14; H01M 4/24; H01M 4/36; H01M 4/624; H01B 1/08; C01B 35/128; C01G 45/12
See application file for complete search history.

(56) References Cited

U.S. PATENT DOCUMENTS

2009/0220860 A1*  9/2009  Xi et al. ............... 429/220
2011/0315919 A1*  12/2011  Kojima et al. ......... 252/182.1

FOREIGN PATENT DOCUMENTS

| JP | 04-237970 | 8/1992 |
| JP | 2004-207051 A | 7/2004 |
| JP | 2010-092608 A | 4/2010 |
| WO | WO 2009/144600 A2 | 12/2009 |
| WO | WO 2011/103554 A1 | 2/2010 |
| WO | WO 2011/128348 A1 | 10/2011 |

OTHER PUBLICATIONS

Hou et al., Preparation and characterization of new cathode material LiMnBO3 for lithium ion ba~ Power Sources. 2008 Set;32(9):611-3.*
Chen et al., Structure and electrochemical properties of LiMnBO3 as a new cathode material for lithium-ion batteries. Journal of Alloys and Compounds. Apr. 2, 2010;494:415-9.*
Allen et al., LIMBO3 (M=Fe, Mn): Potential cathode for lithium ion batteries. Mat. Res. Soc. Symp. Proc. Jan. 1, 2002;730:VI.8.1-.6.*
Invitation to Pay Additional Fees for Application No. PCT/US2011/035342 mailed Sep. 14, 2011.
International Search Report and Written Opinion for Application No. PCT/US2011/035342 mailed Nov. 30, 2011.
International Preliminary Report on Patentability for Application No. PCT/US2011/035342 mailed Nov. 22, 2012.
Abouimrane et al., Carbon nano-painting: Application to non-phosphate oxyanions e.g. borate. Electrochemical Society Proceedings. Jan. 1, 2003;2003-20:15-22.
Ardelean et al., Megnetic behavior of some lithium-borate glasses with manganese ions. Rev Roum Phys. 1988;33(2):179-83. (The year of publication is sufficiently earlier than the effective U.S. filing date and any foreign priority date so that the particular month of publication is not in issue. See MPEP 609.04(a)).
Bondareva et al., The crystal structures of LiZnBO3 and LiMnBO3. Kristallografiya. Jun. 1978;23(3):487-90.

(Continued)

*Primary Examiner* — Charles Boyer
(74) *Attorney, Agent, or Firm* — Wolf, Greenfield & Sacks, P.C.

(57) ABSTRACT

The present invention generally relates to certain lithium materials, including lithium manganese borate materials. Such materials are of interest in various applications such as energy storage. Certain aspects of the invention are directed to lithium manganese borate materials, for example, having the formula $Li_xMn_y(BO_3)$. In some cases, the lithium manganese borate materials may include other elements, such as iron, magnesium, copper, zinc, calcium, etc. The lithium manganese borate materials, according to one set of embodiments, may be present as a monoclinic crystal system. Such materials may surprisingly exhibit relatively high energy storage capacities, for example, at least about 96 mA h/g. Other aspects of the invention relate to devices comprising such materials, methods of making such materials, kits for making such materials, methods of promoting the making or use of such materials, and the like.

29 Claims, 4 Drawing Sheets

(56) References Cited

OTHER PUBLICATIONS

Cheishvili et al., Glass formation in the system Li2O-MnO-B2O3-TiO2 and electric conductivity of glasses of this system. Proc Georgian Acad Sci. 2001;27(1-2):116-21. (The year of publication is sufficiently earlier than the effective U.S. filing date and any foreign priority date so that the particular month of publicaion is not in issue. See MPEP 609.04(a)).

Gowda et al., Transport properties of Li2O-MnO2-B2O3 glasses. Solid State Ioncis. 2005:176(15-16):1393-1401. (The year of publication is sufficiently earlier than the effective U.S. filing date and any foreign priority date so that the particular month of publication is not in issue. See MPEP 609.04(a)).

Hou et al., Preparation and characterization of new cathode material LiMnBO3 for lithium ion battery. Chinese Journal of Power Sources. Sep. 2008;32(9):611-3.

Kim et al., Sythesis and electrochemical properties of monoclinic LiMnBO3 as a Li intercalation material. Journal of the Electrochemical Society. Jan. 20, 2011;158(3):A309-15.

Legagneur et al., LiMBO3 (M=Mn, Fe, Co): synthesis, crystal structure and lithium deinsertion/insertion properties. Solid State Ionics. Jan. 2001;139(1-2):37-46.

Lehmann et al., Chemistry and constitution of borates. XV. Formation and preparation of mixed monoborates of the type MLiBO3. Z Anorg Allg Chem. 1966:348(1-2):42-9. (The year of publication is sufficiently earlier than the effective U.S. filing date and any foreign priority date so that the particular month of publication is not in issue. See MPEP 609.04(a)).

LI et al., Magnetic order of LiMnBO3: A new type of chiral magnetic ground state. Physical Review B. Aug; 2002;66:052405.1-.4.

Norrestam, The crystal structure of monoclinic lithium magnesium borate (LiMnBO3). Z Kristallogr. 1989;187(1-2):103-10. (The year of publication is sufficiently earlier than the effective U.S. filing date and any foreign priority date so that the particular month of publication is not in issue. See MPEP 609.04(a)).

Piffard et al., Cobalt Lithiumorthoborate, LiCoBO3. Acta Cryst. Nov. 1998;C54:54(11):1561-3.

Wang et al., Activation of LiMnBO glass as cathode material for lithium-ion batteries. J Mater Chem. 2000:10(6):1465-7. (The year of publication is sufficiently earlier than the effective U.S. filing date and any foreign priority date so that the particular month of publication is not in issue. See MPEP 609.04(a)).

Wang et al., Crystallization mechanism in amorphous material of 0.5LiMnO2-0.5B2O3. J Mater Sci. 2000:35(7):1695-8. (The year of publication is sufficiently earlier than the effective U.S. filing date and any foreign priority date so that the particular month of publication is not an issue. See MPEP 609.04(a)).

Wang et al., Investigations on conductivity anomalies in Li2O-4MnO-4B2O3 glasses. Solid State Ionics. 2001;140(3,4)307-11. (The year of publication is sufficiently earlier than the effective U.S. filing date and any foreign priority date so that the particular month of publication is not in issue. See MPEP 609.04(a)).

Lee et al., Structure and Electrochemical Behavior of $LiMnBO_3$ Synthesized at Various Temperatures. Electron. Mater.Lett., vol. 10, No. 1 (2014), pp. 253-8. DOI: 10.1007/s13391-013-3170-7.

Tang et al., Electrochemical performance of $LiMNBO_3$/C composite synthesized by a combination of impregnation and precipitation followed by annealing. Journal of Power Sources. 2015. 275; 888-92.

\* cited by examiner

ELECTROCHEMICAL DEVICE COMPRISING LITHIUM MANGANESE BORATE COMPOUNDS

RELATED APPLICATIONS

This application claims the benefit of U.S. Provisional Patent Application Ser. No. 61/332,502, filed May 7, 2010, entitled "Lithium Manganese Borate Compounds," by Ceder, et al., incorporated herein by reference.

FIELD OF INVENTION

The present invention generally relates to certain lithium materials, including lithium manganese borate materials. Such materials are of interest in various applications such as energy storage.

BACKGROUND

Demand for lightweight, high energy density batteries, for example, to power vehicles or portable electronic devices, continues to rise. However, although many compounds have been studied for use in batteries and other energy storage applications, it remains difficult to identify compounds having good characteristics of thermal stability and high energy densities. Accordingly, improvements in compounds for use in batteries and other energy storage applications are still needed.

SUMMARY OF THE INVENTION

The present invention generally relates to certain lithium materials, including lithium manganese borate materials. Such materials are of interest in various applications such as energy storage. The subject matter of the present invention involves, in some cases, interrelated products, alternative solutions to a particular problem, and/or a plurality of different uses of one or more systems and/or articles.

In one aspect, the present invention is generally directed to an electrochemical device. According to one set of embodiments, the electrochemical device comprises $Li_xMn_y(BO_3)$ exhibiting a monoclinic crystal system. In some cases, x and y are each greater than 0. In another set of embodiments, the electrochemical device comprises $Li_xMn_yA_zBO_3$ having a monoclinic crystal system. In some embodiments, x is greater than 0, y is greater than 0, z is no more than about 0.2, and A when present is one or more of Fe, Mg, Cu, Zn, Co, Ni, or Ca.

The present invention, according to another aspect, is generally directed to an article. In one set of embodiments, the particle comprises a core and a carbon-containing coating. The core, according to some embodiments, comprises $Li_xMn_yA_zBO_3$, where x is greater than 0, y is greater than 0, z is no more than about 0.2, and A when present is one or more of Fe, Mg, Cu, Zn, Co, Ni, or Ca.

In yet another aspect, the present invention is directed to a method. According to one set of embodiments, the method includes an act of heating a precursor particle to produce a coated particle comprising a core and a coating surrounding at least a portion of the core. In some embodiments, the precursor particle comprises $Li_xMn_yA_zBO_3$, where x is greater than 0, y is greater than 0, z is no more than about 0.2, and A when present is one or more of Fe, Mg, Cu, Zn, Co, Ni, or Ca.

The method, in accordance with another set of embodiments, includes an act of exposing a precursor particle to high-energy or planetary ball milling. In some cases, the precursor particle includes $Li_xMn_yA_zBO_3$, where x is greater than 0, y is greater than 0, z is no more than about 0.2, and A when present is one or more of Fe, Mg, Cu, Zn, Co, Ni, or Ca.

In another aspect, the present invention is directed to a method of making one or more of the embodiments described herein, for example, certain lithium manganese borate materials. In another aspect, the present invention is directed to a method of using one or more of the embodiments described herein, for example, certain lithium manganese borate materials.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to certain lithium materials, including lithium manganese borate materials. Such materials are of interest in various applications such as energy storage. Certain aspects of the invention are directed to lithium manganese borate materials, for example, having the formula $Li_xMn_y(BO_3)$. In some cases, the lithium manganese borate materials may include other elements, such as iron, magnesium, copper, zinc, calcium, etc. The lithium manganese borate materials, according to one set of embodiments, may be present as a monoclinic crystal system. Such materials may surprisingly exhibit relatively high energy storage capacities, for example, at least about 96 mA h/g. Other aspects of the invention relate to devices comprising such materials, methods of making such materials, kits for making such materials, methods of promoting the making or use of such materials, and the like.

A rechargeable lithium (Li) battery typically has electrodes that exchange Li during charging and discharging. The rate at which this Li can be exchanged is important in many applications where high charge and/or discharge rates are required. In order to achieve high rate capability, Li$^+$ ions and electrons have to be able to rapidly move through the electrode structure to the surface of an active material, and then be rapidly absorbed by the active material. For a cathode material, Li$^+$ and electrons are absorbed during discharge of the battery, and this process is reversed during charging. Though the present invention is not limited to cathodes, as used herein, "charging" indicates Li removal and "discharging" refers to Li insertion.

One aspect of the invention is generally directed to compounds comprising or consisting essentially of lithium, manganese, and borate (BO$_3$), which may be of use in rechargeable lithium batteries or other energy storage applications. In some cases, other elements may be present (e.g., as impurities), such as magnesium (Mg), calcium (Ca), bismuth (Bi), tin (Sn), antimony (Sb), or transition metals such as scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), tungsten (W), etc. Lithium, manganese, and the borate group may, in certain cases, contribute at least about 50 wt % of the compound, and in some cases, at least about 75 wt %, at least about 80 wt %, at least about 85 wt %, at least about 90 wt %, at least about 95 wt %, or at least about 99 wt % of the compound.

In one set of embodiments, the compound is a lithium manganese borate material having a formula:

$$Li_xMn_yA_zBO_3.$$

In this formula, x is greater than 0, and y is greater than 0. z may be 0 or a number greater than 0, and A (if present) includes one or more inert elements or impurities that do not substantially affect the crystal structure of the compound, e.g., as discussed below. For instance, A may include one or more of magnesium, calcium, bismuth, tin, antimony, or transition metals such as scandium, titanium, vanadium, chromium, manganese, iron, cobalt, nickel, copper, zinc, yttrium, zirconium, niobium, molybdenum, tungsten, etc. For example, A may include one or more of Fe, Mg, Cu, Zn, Co, Ni, or Ca. In some cases, z is no more than about 1, no more than about 0.5, no more than about 0.3, no more than about 0.1, no more than about 0.05, no more than about 0.03, no more than about 0.01, no more than about 0.005, no more than about 0.003, or no more than about 0.001.

x may be, in some cases, between about 0.5 and about 1.5, between about 0.7 and about 1.3, or between about 0.9 and about 1.1. Similarly, y may be, in some cases, between about 0.5 and about 1.5, between about 0.7 and about 1.3, or between about 0.9 and about 1.1. For example, x may be 1 and/or y may be 1. In some (but not all) embodiments x and y are substantially equal. In certain embodiments, the sum of y and z may be between about 0.5 and about 1.5, between about 0.7 and about 1.3, or between about 0.9 and about 1.1. In some cases, the sum of y and z is about 1. In one set of embodiments, the compound has a formula $Li_xMn_y(BO_3)$, where x and y are each greater than 0 and z is 0. If x is 1 and y is 1, then the compound has the formula $LiMn(BO_3)$.

These compounds as discussed herein, in some embodiments, are solid, and in some cases, crystalline; for example, the cations and anions disclosed herein forming the compound may be arranged in a repeating array having a definite crystal structure, i.e., defining a unit cell atomic arrangement that is repeated to form the crystal structure. In some embodiments, at least some of the compound may be present in a crystal structure that is a monoclinic crystal system. In a monoclinic crystal system, the unit cell atomic arrangement can be described by three vectors each of unequal length that form a rectangular prism with a parallelogram as its base. Here, two pairs of vectors are perpendicular, while the third pair makes an angle other than 90°.

Other crystal structures may also be present. For instance, at least about 99% (by weight) of a sample of the compound may exhibit the monoclinic crystal system, while the other 1% of the compound may exhibit other crystal systems, for example, a hexagonal crystal system. In some cases, at least about 95%, at least about 90%, at least about 80%, at least about 70%, at least about 60%, at least about 50%, at least about 40%, at least about 30%, or at least about 20% of the compound may exhibit the monoclinic crystal system. The presence of crystal systems such as these may be determined using any suitable technique known to those of ordinary skill in the art, for example, by determining the specific capacity of an electrochemical device containing the compound, using XRD/Rietveld refinement techniques, or the like, as discussed herein.

Figure 4A:
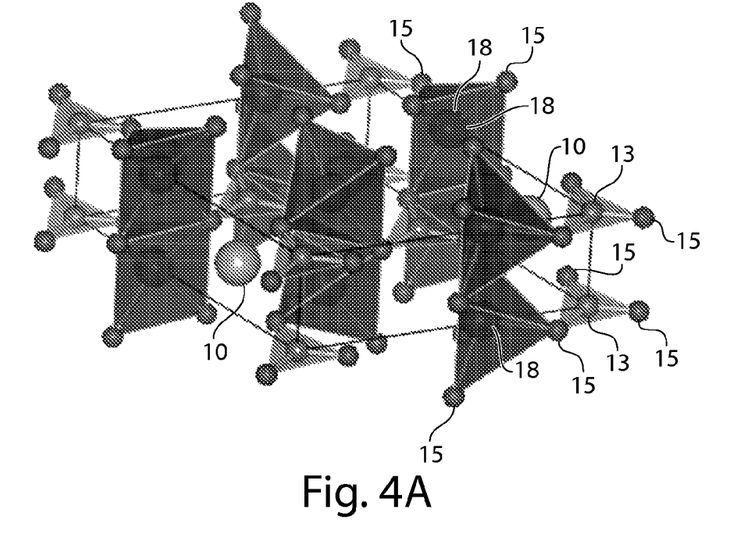
FIGS. 4A-4B illustrate various crystal structures for LiMn(BO$_3$), in still another embodiment of the invention.
Figure 4B:
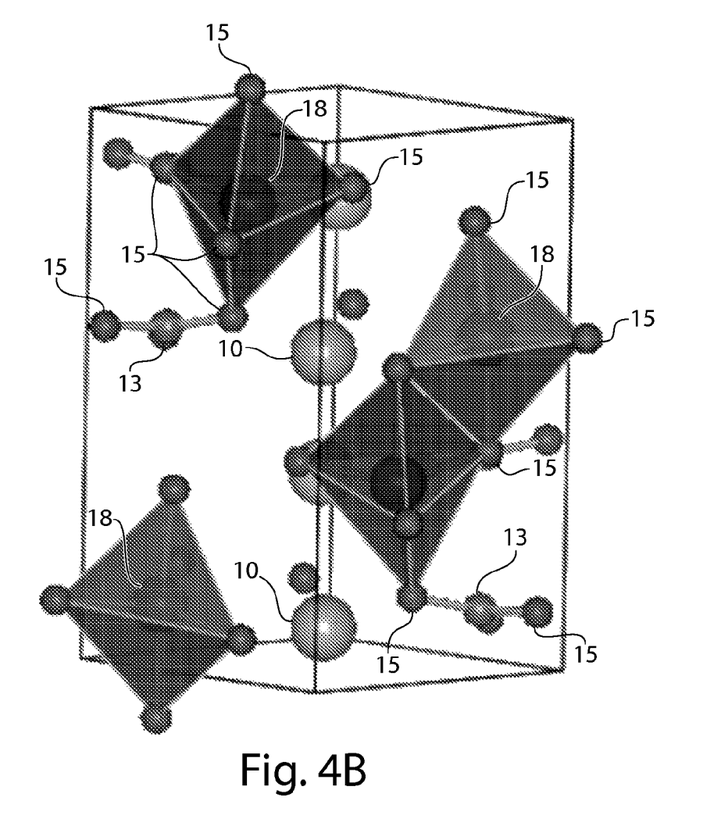

Without wishing to be bound by any theory, it is believed that the monoclinic crystal system for such compounds allows significant ionic transport (e.g., of lithium ions) therein, compared to other crystal systems (such as hexagonal crystal system) for such compounds. For example, referring to FIG. 4, FIG. 4A shows $LiMn(BO_3)$ exhibiting a hexagonal crystal structure, while FIG. 4B shows $LiMn(BO_3)$ exhibiting a monoclinic crystal structure. In these figures, 10 is lithium, 13 is boron, 15 is oxygen, and 18 is manganese. As can be seen in these figures, FIG. 4A shows a relatively condensed structure which limits the ability of lithium to move, while FIG. 4B shows a relatively open structure that may allow more lithium transport to occur therein.

In some cases, other ions may also be present within the crystal structure (e.g., as substituents or impurities), although such ions may not, in some embodiments, substantially alter the crystal structure of the compound. For instance, ions such as magnesium, calcium, bismuth, tin, antimony, or transition metals such as scandium, titanium, vanadium, chromium, manganese, iron, cobalt, nickel, copper, zinc, yttrium, zirconium, niobium, molybdenum, tungsten, etc. may be found in the crystal structure.

In some aspects, the compound is sufficiently stable that it exhibits no more than about 3 ml/g of oxygen release when heated to a temperature of 250° C. or 300° C. In some cases, the compound release no more than about 1 ml/g, about 0.3 ml/g, about 0.1 ml/g, or about 0.03 ml/g of oxygen upon exposure to such temperatures. Without wishing to be bound by any theory, it is believed that the thermal stability and/or the inability of the compound to release oxygen may be due to the presence of polyanionic groups within the compound, e.g., borate (BO$_3$), unlike other compounds such as $Li_xCoO_2$ which do not contain such polyanionic groups. In some cases, the polyanionic groups may release less O$_2$ at elevated temperatures, which could be an important safety feature for certain applications such as lithium ion batteries. In addition, to lower the weight, lower-weight polyanionic groups such as borate may be useful, e.g., for higher energy and power densities. In some embodiments, the compound contains no more than about 20 mol %, about 15 mol %, about 10 mol %, or about 5 mol % of anionic (non-polyanionic) oxide.

The thermal stability of the compound may be determined using any suitable technique. One non-limiting example is differential scanning calorimetry (DSC). Thus, for example, the compound may exhibit no thermal transitions below 200°

C., 250° C., 300° C., 350° C., or 400° C. when analyzed using differential scanning calorimetry (DSC).

In one set of embodiments, the compound has a specific capacity of at least about 50 mA h/g, and in some cases, at least about 60 mA h/g, at least about 70 mA h/g, at least about 80 mA h/g, at least about 90 mA h/g, at least about 96 mA h/g, at least about 100 mA h/g, at least about 120 mA h/g, at least about 140 mA h/g, at least about 160 mA h/g, at least about 180 mA h/g, at least about 200 mA h/g, at least about 210 mA h/g, or at least about 220 mA h/g, etc. as measured at a discharge rate of C/20, C/50, or C/100 (C=222 mA/g). Such specific capacities may be measured, for example, by using the relevant compound as a positive electrode in an electrochemical cell against a Li anode, charging the compound to a maximum of 4.5 V, 4.6 V, 4.9 V, or 5.2 V (relative to the potential of $Li^+$/Li, i.e., relative to the potential of $Li^+$ in Li metal, e.g., in a Li metal anode), then discharging the compound to 2.0 V at a rate of at least about 11.1 mA/g. The current density of the compound, when used as an electrode, may be less than about 1 $mA/cm^2$ of electrode surface.

Compounds such as these may be prepared, according to another aspect of the invention, by combining one or more suitable precursors together, and firing or heating the precursors together, removing undesirable components or elements, to produce the final compound. In some cases, the precursors may be combined together in suitable stoichiometric ratios such that the final compound formed is stoichiometrically balanced.

As non-limiting examples of precursors, a precursor of lithium may be a salt or other compound comprising lithium, for instance, lithium carbonate ($Li_2CO_3$) or lithium phosphate ($Li_3PO_4$). A precursor of iron may be a salt or other compound comprising iron, for example, iron oxalate ($FeC_2O_4$), iron (II) carbonate ($FeCO_3$), and/or iron acetate ($Fe(CH_3COO)_2$). A precursor of manganese may be a salt or other compound comprising manganese, for instance, manganese carbonate ($MnCO_3$) or manganese oxalate dihydrate ($MnC_2O_4H_2O$). A precursor of borate may be boric acid ($H_3BO_3$) or a salt or other compound comprising borate, for example, lithium borate ($LiBO_3$) or manganese borate. In some cases, a precursor may be a precursor of more than one of Li, Mn, $BO_3$, etc. (e.g., $LiBO_3$ or manganese borate). The precursors may also be mixed prior to sintering, for example, by grinding, milling (e.g., ball milling), or the like.

Precursors of lithium, manganese, and borate (and optionally others), when sintered together, may be used to produce the compounds discussed herein. If the precursors are present in non-stoichiometric ratios (e.g., there is a deficiency of Li and/or Mn), particles having non-stoichiometric overall compositions such as those described above may form.

In some cases, the precursors are heated at lower temperatures to decompose organic sources such as carbonates, oxalates, etc. prior to sintering. For instance, the precursors may be first heated at temperatures of less than about 300° C., less than about 350° C., or less than about 400° C. In some cases, the precursors may be heated under an inert and/or a reducing atmosphere. In some cases, the precursors are then ground or milled prior to sintering. A reducing atmosphere is one that does not contain molecular oxygen ($O_2$), and/or other oxidizing species. For example, the reducing atmosphere may comprise $H_2$ and/or $H_2O$, CO and/or $CO_2$, $N_2$, Ar or other noble gases, $NH_3$, etc., and all combinations thereof.

In some cases, the particles may be sintered at relatively low temperatures, for example, less than about 800° C., less than about 750° C., less than about 700° C., less than about 650° C., less than about 600° C., or less than about 550° C. In one set of embodiments, the sintering is performed at 500-550° C. In some embodiments, sintering of the precursors occurs in a reducing atmosphere, such as discussed above.

After formation of the compound, the compound may be ground or milled to form particles, for example, using ball milling. In some cases, the particles may be treated to coat the particles, for instance, with a carbon-containing coating, thereby forming a coated particle, according to another aspect of the invention. A coated particle may have a core and coating surrounding at least a portion of the core. For instance, the core may comprise or consist essentially of a lithium manganese borate compound (or other compound) as described herein, partially or completely surrounded by a carbon-containing coating. In some embodiments, the core and the coating are formed at the same time; in other cases, the core is first formed, then the coating is applied to the core. For instance, as discussed below, the particles may be mixed with a carbon-containing organic or inorganic material (e.g., sucrose), and optionally ground or milled, for example, using ball milling, or planetary or high-energy ball milling.

Generally, the core and the coating can be separately identified within a coated particle. For example, the core and the coating may be identified as having different structures (e.g., different degrees of crystallinity or crystal structure), different compositions, and/or different morphologies (e.g., being readily identifiable as a core and a coating surrounding the core, which is often relatively thin), and such regions may be readily identified using techniques such as light microscopy or TEM (transmission electron microscopy). Other techniques are described in detail below. Thus, for example, relative amounts of crystal structure (ranging from, e.g., purely crystalline, microcrystalline, poorly crystalline, or amorphous) may be determined for a particle, and used to determine the presence of the core and the coating. As a specific example, a coated particle may comprise a crystalline core and a coating that is less crystalline (e.g., crystalline but to a lesser degree, microcrystalline, or even amorphous).

In some cases, two or more particles may "fuse" during formation, resulting in a combination of particles including more than one core, and/or aggregates in which there is a discrete phase (cores) and a continuous phase (the coatings, which may be thought of as a matrix containing the cores). Accordingly, it should be understood that although "core" and "coating" are often used herein in singular form, this is by way of example only, and in other embodiments, a particle may contain multiple cores, there may be an aggregate of particles having the features discussed herein, etc. The particles may be distributed within the matrix in any manner, e.g., homogeneously, heterogeneously, etc. In some cases, the matrix may be porous.

Typically, a particle containing a compound as discussed herein will have an average diameter of less than about 5 micrometers, where the "average diameter" is the diameter of a perfect sphere having the same volume as the particle. In some cases, the particle may have an average diameter of less than about 1 micrometer, less than about 750 nm, less than about 500 nm, less than about 250 nm, less than about 100 nm, less than about 75 nm, or less than about 50 nm. The coating (if present) may comprise a relatively small portion of the particle. For example, the coating may have an average thickness of less than about 250 nm, less than about 200 nm, less than about 150 nm, less than about 100 nm, less than about 70 nm, less than about 50 nm, less than about 20 nm, less than about 15 nm, less than about 10 nm, less than about 5 nm, or less than about 3 nm. In some embodiments, the coating is a carbon-containing coating containing at least about 50 wt % carbon, and in some cases, the coating is at least about 55 wt % carbon, at least about 60 wt % carbon, at least about 65 wt % carbon, at least about 70 wt % carbon, at least about 75 wt % carbon, at least about 80 wt % carbon, at least about 85 wt % carbon, at least about 90 wt % carbon, at least about 95 wt % carbon, or at least about 99 wt % carbon.

Accordingly, in one aspect, a coated particle comprises a core that is crystalline, or at least essentially crystalline. The crystalline part of a material can be determined using techniques known to those of ordinary skill in the art, for example, by applying X-ray diffractive measurement, e.g., X-ray diffraction (XRD), electron diffraction techniques, or observation using transmission electron microscopy, e.g., via TEM diffractive measurements.

As a non-limiting example, copper metal (characteristic wavelength of 1.5401 Angstroms) can be used as an X-ray source in XRD. The materials may be prepared in powder form (e.g., by using an agate mortar), and the X-rays directed at the powder. After interaction, the X-rays are reflected or transmitted, and these X-rays typically will have different wavelengths from the incident beam. Crystalline materials typically will have a series of sharp, discrete peaks when studied using such techniques, for example, as determined by measuring XRD peak broadening or comparison of the peaks at FWHM (full width at half maximum). Poorly crystalline or amorphous materials may have larger FWHM values or large peak broadening, as compared to crystalline materials. For example, an XRD data may show an "amorphous hump," which is a broad hump around a low angle range (typically less than 30°). The amorphous phase can also be characterized, e.g., using Rietveld refinement with a reference phase, usually silicon or $Al_2O_3$. In addition, the amorphous phase can be determined in some cases using XRD measurements on different temperature samples.

Electron diffraction and transmission electron microscopy (TEM) can also be used to determine crystal structure. These techniques typically will have finer spatial resolution than XRD, and can be used to observe local variations in crystal structure. Such techniques can be used by those of ordinary skill in the art to distinguish the core from the coating, e.g., when the latter is amorphous or poorly crystallized. For example, for electron diffraction, the electron beam can be directed at different regions of a sample (e.g., at the core and the coating of a particle), and the degree of diffraction of those regions can be determined to determine crystal structure. Thus, an electron beam directed at a core may exhibit a high degree of diffraction, indicating that the core is crystalline, while the electron beam directed at a coating may exhibit no diffraction, or a relatively low degree of diffraction, indicating that the coating is amorphous or poorly crystalline.

In some embodiments, the grain size of the crystalline material may also be determined, for example, using techniques such as transmission electron microscopy (TEM). For instance, the core may have an average grain size of less than about 150 nm, less than about 100 nm, less than about 50 nm, less than about 30 nm, less than about 20 nm, less than about 10 nm, or less than about 5 nm in some cases. As discussed below, the grain size of such particles, in some cases, can be controlled.

The coating, in some embodiments, may not be fully crystalline, and may appear to be amorphous when examined by TEM, i.e., no areas can be observed in electron diffraction images of the coating that would be indicative of the presence of a crystalline phase within the coating. Such a coating may be amorphous, or may have some degree of crystal structure (e.g., having a microcrystalline structure). The TEM may be performed in imaging mode (e.g., producing images for subsequent study), or in diffraction mode (e.g., producing diffraction patterns indicative of the amount of crystal structure). A coating may thus appear amorphous if there is no crystalline signal when the coating of the particle is measured or otherwise determined using TEM. For example, in TEM diffraction mode, a crystalline material will have several spots, corresponding to crystalline structure or atomic periodicity, while an amorphous or poorly crystalline material may not produce such spots. As another example, in HR-TEM (high-resolution TEM), crystalline materials will typically exhibit a lattice fringe or structure, while amorphous materials will exhibit no lattice fringe.

Another technique that may be used to determine a coating, and properties of the coating (e.g., crystal structure) is X-ray photoelectron spectroscopy (XPS). Those of ordinary skill in the art will be aware of XPS techniques. In general, in XPS, X-rays are directed at a sample (or portions of the sample), and the energy of the ejected electrons (photoelectrons) are measured to determined the binding energy of the electrons, which are used to determine the surface composition.

The coating may be distinguished from the core, in some embodiments, by comparison of XRD measurements or other measurements that measure crystal structure of the bulk of the sample, and TEM or other surface measurements that measure crystal structure of the surface of the sample. Differences between the bulk measurements and the surface measurements can then be used to determine the presence and/or properties of the core and of the coating.

In one set of embodiments, the coating is formed by coating a carbon-containing material on particles comprising lithium-containing compounds formed as previously described, for example, particles of lithium manganese borate compounds. In some aspects, the coating may be both ionically conductive (e.g., to Li ions) and electronically conductive (to electrons). The coating may be any organic or inorganic material containing carbon, where some or all of the non-carbon elements may be removed during heating, annealing, or sintering of the particles. For instance, an organic material such as sucrose (table sugar), glucose, corn starch, etc. may be applied to the surface of the particles, then annealed under suitable conditions, removing at least some of the hydrogen, oxygen, etc., to produce a carbon-containing coating on the particles, thereby forming a coated particle. The particle may be heated to a temperature of at least about 300° C., at least about 350° C., at least about 400° C., at least about 450° C., at least about 500° C., at least about 550° C., at least about 600° C., at least about 650° C., at least about 700° C., or at least about 750° C. to remove at least some of the non-carbon elements. In one set of embodiments, the temperature may be between about 300° C. and about 600° C. In some cases, the temperature may be such that substantial thermal degradation of the particles does not occur. For example, the particle may be heated to no more than about 800° C., no more than about 750° C., no more than about 700° C., no more than about 650° C., no more than about 600° C., no more than about 550° C., or no more than about 500° C. In some cases, the heating may be performed under a reducing atmosphere, e.g., one in which there is little or no oxygen present. For example, reducing atmosphere may comprise $H_2$ and/or $H_2O$, CO and/or $CO_2$, $N_2$, Ar or other noble gases, $NH_3$, etc., and all combinations thereof.

In some cases, various other elements may be present within the coating, which may include elements excluded from the core, other elements present when the particle was formed, impurities within the carbon-containing material, or the like. For example, the coating, in addition to carbon, may contain one or more of lithium, phosphate, borate, silicate, nitrogen, a transition metal such as iron, manganese, cobalt, nickel, or other elements as discussed herein, in any suitable form.

According to various aspects of the invention, compounds such as those described herein may be used in a wide variety of purposes. In some embodiments, the compound may be present within a composition which can optionally include other materials, such as binders (e.g., polytetrafluoroethylene, polyvinylidenefluoride, etc.), fillers, hardeners, or the like. For instance, in one set of embodiments, the compound may be present within an electrochemical device, for example, as a battery material, for use in applications such as power tools, hybrid electric vehicles, portable electronic devices, laptop computers, and the like. In some such embodiments, the compounds of the invention may be able to store charge, e.g., electronic charge. For example, the compounds may be present in an electrode within a suitable electrochemical device, e.g., as a positive electrode within a battery, fuel cell, etc.

In one set of embodiments, particles such as those described herein (coated or uncoated) can be formed into electrodes (e.g., a positive electrode) for use in an electrochemical device. For instance, the particles may be pressed, optionally with carbon, binders (e.g., polytetrafluoroethylene, polyvinylidenefluoride, etc.), fillers, hardeners, or the like to form a solid article usable as an electrode in such an electrochemical device. The electrode may have any suitable shape for use within such a device. In some cases, at least about 50 wt % of the electrode is formed from the particles, and in some cases, at least about 75 wt %, at least about 80 wt %, at least about 85 wt %, at least about 90 wt %, at least about 95 wt %, or at least about 99 wt % of the electrode is formed from the particles. In some embodiments, additional carbon may be present as part of the electrode (note that this should be distinguished from the carbon-containing coating on the particles as previously discussed), for example, as carbon black or carbon powder; for example, about 5 wt %, about 10 wt %, or about 15 wt % of the electrode may be formed from the additional carbon. Other materials may also be present within the electrode, for instance, binders, fillers, hardeners, or the like, e.g., forming about 5 wt %, about 10 wt %, or about 15 wt % of the electrode, depending on the embodiment.

In some embodiments, a compound as discussed herein may be used within a rechargeable alkali metal battery, for example, within or as an electrode. A rechargeable alkali metal battery, such as a lithium battery or a sodium battery, typically has electrodes that exchange lithium or sodium, respectively, during charge and discharge. The rate at which the alkali metal ions can be exchanged is important in many applications where high charge and/or discharge rates are required for the battery. For a cathode material, alkali metal ions (such as lithium) and electrons are adsorbed during the discharge of the battery, and this process is reversed during the charge.

In certain embodiments, various compositions as discussed herein can be selected and/or optimized, e.g., for use in batteries and/or other electrochemical devices based on screening tests, for example, based on charging or cycling profiles. For instance, a composition may be formed into a cathode in an electrochemical cell and charged against a lithium anode. By exposing the compound to various voltages (e.g., 4.5 V, 4.6 V, 4.9 V, or 5.2 V, relative to the potential of $Li^+/Li$), then discharging the compound to 2.0 V at a rate of at least about 11.1 mA/g, the performance of various compositions can be ascertained, and used to select or optimize compositions for use in a particular battery and/or other electrochemical device. A compound may be selected to have a specific capacity of at least about 50 mA h/g, and in some cases, at least about 60 mA h/g, at least about 70 mA h/g, at least about 80 mA h/g, at least about 90 mA h/g, at least about 96 mA h/g, at least about 100 mA h/g, at least about 120 mA h/g, at least about 140 mA h/g, at least about 160 mA h/g, at least about 180 mA h/g, at least about 200 mA h/g, at least about 210 mA h/g, at least about 220 mA h/g, or at least about 230 mA h/g, etc. As another example, the compound may be repeated charged and discharged as described above, with better or more optimized compounds yielding better charging characteristics after more charge/discharge cycles.

The invention also involves, in some aspects, the promotion of the use of a material to store energy in a battery according to any of the techniques and compositions described herein. As used herein, "promoted" includes all methods of doing business including, but not limited to, methods of selling, advertising, assigning, licensing, contracting, instructing, educating, researching, importing, exporting, negotiating, financing, loaning, trading, vending, reselling, distributing, replacing, or the like that can be associated with the methods and compositions of the invention, e.g., as discussed herein. Promoting may also include, in some cases, seeking approval from a government agency. Methods of promotion can be performed by any party including, but not limited to, businesses (public or private), contractual or subcontractual agencies, educational institutions such as colleges and universities, research institutions, governmental agencies, etc. Promotional activities may include instructions or communications of any form (e.g., written, oral, and/or electronic communications, such as, but not limited to, e-mail, telephonic, facsimile, Internet, Web-based, etc.) that are clearly associated with the invention. As used herein, "instructions" can define a component of instructional utility (e.g., directions, guides, warnings, labels, notes, FAQs ("frequently asked questions"), etc., and typically involve written instructions on or associated with the composition and/or with the packaging of the composition. Instructions can also include instructional communications in any form (e.g., oral, electronic, digital, optical, visual, etc.), provided in any manner such that a user will clearly recognize that the instructions are to be associated with the composition, e.g., as discussed herein.

U.S. Provisional Patent Application Ser. No. 61/332,502, filed May 7, 2010, entitled "Lithium Manganese Borate Compounds," by Ceder, et al., is incorporated herein by reference in its entirety.

The following examples are intended to illustrate certain embodiments of the present invention, but do not exemplify the full scope of the invention.

EXAMPLE 1

Currently, the lithium ion battery industry uses lithium transition metal oxides as cathode materials. Recently, materials containing polyanion groups such as phosphate ($PO_4$) or silicate ($SiO_4$) have generated interest because of the inherent stability of the polyanion group against oxygen loss. See, e.g., U.S. Provisional Patent Application Ser. No. 61/306,670, filed Feb. 22, 2010, entitled "Carbophosphate and Related Compounds," by G. Ceder, et al., incorporated herein by reference in its entirety. Among them, the $LiFePO_4$ compound is currently considered a successful polyanionic material due to its low cost, high stability, low toxicity and high rate capability as well as long cycle life.

However, the borate group has the lowest weight of all polyanion groups and therefore has benefits in specific energy density compared to other polyanionic materials. Surprisingly however, this material has not been investigated carefully or intensively. One potential material, $LiMnBO_3$, was regarded as an unsuccessful cathode material due to its low electrochemical activity. This $LiMnBO_3$ compound had a hexagonal setting with the space group of P-6. This material showed negligible capacity of 6 mA h/g even at very slow charging and discharging rates. See Allen, et al., *Mat. Res. Symp. Proc.*, 730, V1.8.1-V1.8.4 (2002), or Légagneur, et al., *Solid State Ionics*, 139, 37-46 (2001). Thus, this material has not been previously investigated further.

One polymorph of $LiMnBO_3$ has a structure in the monoclinic crystal system with C12/c1 symmetry. In this example, monoclinic $LiMnBO_3$ was synthesized and electrochemically tested in order to demonstrate its usefulness as a cathode material for lithium ion batteries. In addition, in order to understand the fundamental aspects of the structure, electrochemical properties, and their relationship of the compound, the two different $LiMnBO_3$ polymorphs were studied by ab initio computations.

The $LiMnBO_3$ samples were synthesized by mixing stoichiometric amounts of $Li_2CO_3$, $MnC_2O_4 \cdot 2H_2O$ and $H_3BO_3$. The raw powders were dispersed into acetone, ball milled for 24-72 hours, and then dried. The mixture was fired at 350° C. for 10 hours under argon atmosphere. Followed by careful grinding, the specimens were pressed into a pellet and sintered at 500-550° C. for 10 hours under an argon atmosphere. In order to coat a conductive carbon phase on the particle surface, the pellet was manually ground, and 10 wt % of sucrose was mixed with the grinded sintered powder by planetary ball milling for 12 hours. The powder was then annealed at 500° C. for 5 hours under an argon atmosphere.

Additional details of this process follow. 1.4778 g of $Li_2CO_3$, 7.1596 g of $MnC_2O_4 \cdot 2H_2O$, and 2.4732 g of $H_3BO_3$ were properly weighed and dispersed into acetone in a Nalgene container. The precursors were ball milled for 72 hours then dried on a 75° C. hot plate in the air overnight. The mixture was pressed into a disc-shaped pellet and then calcined at 350° C. for 10 hours under argon atmosphere. The calcined disc was thoroughly ground manually and pressed into a disc shape again for sintering. It was sintered at 550° C. for 10 hours under argon atmosphere. The sintered pellet was then ground manually.

To make an electrode, the ground material was mixed with carbon black and polytetrafluoroethylene (PTFE). In the process of mixing, the weight ratio between the active material and carbon black was systematically varied. Different mixing methods such as manual mixing and planetary ball milling were utilized for further optimization. Among the investigated weight ratios, 16:3 (the active material:carbon black) ratio by planetary ball milling led to the best performance. The amount of PTFE was fixed to be 5% of the total electrode by weight and mixed only manually. One example composition of a 1.8 mg electrode was 1.44 mg of the active material, 0.27 mg of carbon black, and 0.09 mg of PTFE.

Sol-gel methods: $LiMnBO_3$ samples were also synthesized by sol-gel methods. In these methods, initial precursors of lithium acetate dehydrate ($Li(CH_3COO) \cdot 2H_2O$), manganese acetate tetrahydrate ($Mn(CH_3COO)_2 \cdot 4H_2O$, and $H_3BO_3$ were dissolved into 150 mL deionized water and agitated with a magnetic stirrer at room temperature in air for 6 hours. Afterwards, 2 g of citric acid was added into the solution as a gelating agent and the solution was vigorously stirred at 90° C. for 48 hours on a hot plate in air in order to evaporate water and form a xerogel, which is a physical mixture of ionized lithium, manganese, and borate ions within organic matrix or framework. The xerogel was dried at 80° C. for 24 hours, manually ground, and fired at 350° C. for 10 hours under an argon atmosphere in order to burn out organic residues. Additional firing at 450° C. to 600° C. for 10 hours under an argon atmosphere was followed to form $LiMnBO_3$.

Non-stoichiometric ratios among precursors: Glassy or poorly-crystallized lithium phosphate ($Li_3PO_4$) surface layers may substantially improve lithium transport in $LiFePO_4$ cathodes due to the high lithium ion mobility in lithium phosphate. Since lithium borate ($Li_3BO_3$ or $LiBO_2$) glass is also a good lithium ion conductor, forming lithium borate phase on the surface of $LiMnBO_3$ may enhance lithium transport in $LiMnBO_3$ cathodes. Thus, for these experiments, the precursors were mixed in non-stoichiometric ratios so that the nominal composition of the final product was $LiMn_{0.9}B_{0.93}O_{0.28}$. The final product was composed of a crystallized $LiMnBO_3$ surrounded by glassy or poorly-crystallized $Li_3BO_3$.

Carbon coating: In order to coat a conductive carbon phase on the particle surface, 10 wt % of sucrose was mixed with the sintered $LiMnBO_3$ powder by high energy ballmilling for 12 hours. The specimens were then annealed at 500° C. for 5 hours under an argon atmosphere. In some cases, in order to introduce uniformly distributed carbon coating, 10 wt % of sucrose was mixed with other precursors before ballmilling. By doing so, sucrose was easier to blend with other lithium, manganese, and borate precursors and was dispersed homogeneously during ballmilling process. Following the same firing procedure as describe in solid state method, an evenly distributed carbon coating layer remained after firing without interrupting $LiMnBO_3$ formation. Note that in some cases, above two carbon coating protocols were combined.

In order to analyze the crystal structure and particle morphology, a Rigaku X-ray diffractometer and transmission electron microscopy (TEM) were performed, respectively. For electrochemical tests, coin cells or Swagelok cells were assembled under an inert atmosphere inside a glove box. The X-ray patterns were obtained on a Rigaku Diffractometer using Cu Kα (K-alpha) radiation by step scanning in the 2θ (2 theta) range of 10° to 80°. Rietveld refinement and profile matching of the powder diffraction data were performed with X'pert HighScorePlus using space group C12/c1 and P-6 for $LiMnBO_3$. A high resolution transmission electron microscopy (HRTEM) image was obtained under an accelerating voltage of 200 keV on a JEOL 2010 FEG analytical electron microscope. The specimens were suspended on a copper grid with lacey carbon.

The cathode was composed of 80 wt % of carbon-coated $LiMnBO_3$, 15 wt % of carbon black, and 5 wt % of PTFE. These components were manually mixed inside an argon-filled glove box. Note that, in some cases, the appropriate amounts of carbon-coated $LiMnBO_3$ and carbon black were mixed by planetary ball milling for 30 minutes, and then PTFE (binder) was added and mixed manually. The exact amount of carbon-coating is unknown, but can be estimated by conservatively assuming that the active mass is 80% by weight in order to calculate a gravimetric capacity. 1 M of $LiPF_6$ in a 1:1 ratio of EC:DMC (ethylene carbonate:dimethyl carbonate) solution and Li metal foil was used as an electrolyte and the counter electrode, respectively.

The amount of carbon coating was identified by combustion infrared detection (ASTM E 1019-080), and the actual amount of $LiMnBO_3$ in the electrode was 72 wt % or 77 wt % when carbon coated depending on the coating method. The specific capacities of C-coated $LiMnBO_3$ were calculated based on these data; 1 M of $LiPF_6$ in 1:1 ratio of ethylene carbonate:dimethyl carbonate (EC:DMC) solution, Celgard 2500, and Li metal foil were used as an electrolyte, the separators, and the counter electrode, respectively. The coin cells or Swagelok cells were assembled inside an argon-filled glove box and tested on a Maccor 2200 at room temperature. Electrochemical tests were also performed at an elevated temperature (60° C.). The loading density of the cathode was approximately 3 mg/cm$^2$. The current density at 1 C was based on the theoretical capacity of 222 mAh/g. All cell tests had 1 min open-circuit rest at the end of each charge and discharge.

The LiMnBO$_3$ polymorphs were investigated by ab initio computations using a density functional theory (DFT) framework and the generalized gradient approximation and a Hubbard U model (GGA+U). Barriers for Li diffusion were calculated for the fully lithiated and fully delithiated limits using the nudged elastic band method. The diffusion pathways calculated corresponded to one-dimensional (1D) Li diffusion via hops between nearest neighbor Li sites.

Figure 1A:
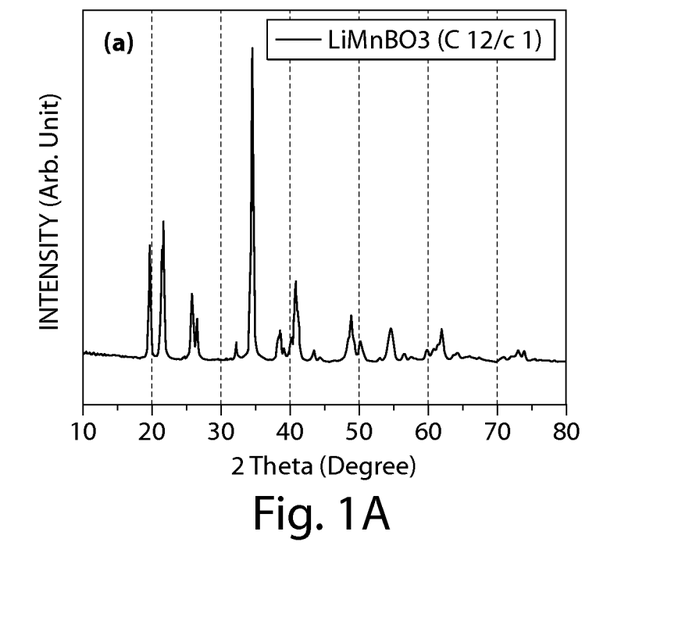
FIGS. 1A-1B illustrate XRD data and Rietveld refinement results for a material in accordance with one embodiment of the invention.
Figure 1B:
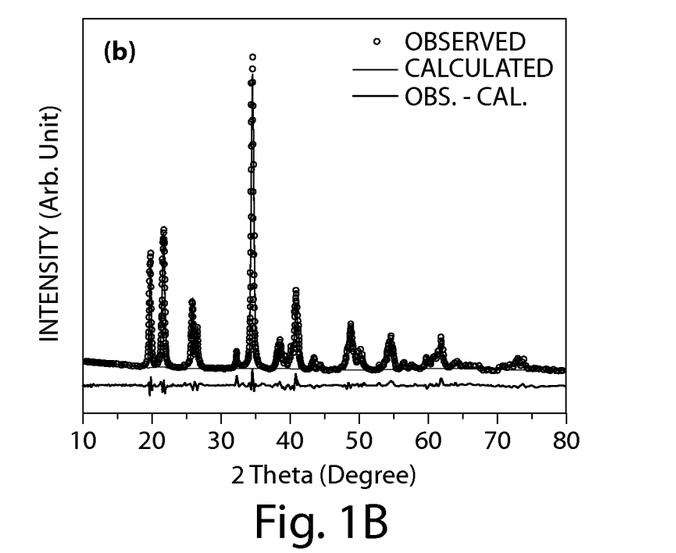

FIGS. 1A and 1B show the XRD pattern and Rietveld refinement results, respectively, of a LiMnBO$_3$ specimen after sintering. According to the pattern, the specimen was well crystallized, and its space group was identified as C12/c1. A minute amount of the hexagonal polymorph phase was detected, although this was essentially negligible. The ratio between the two phases and the calculated lattice parameters are summarized in Table 1.

TABLE 1

| Phase | Ratio (%) | a (Å) | b (Å) | c (Å) | V (Å$^3$) | GOF | $R_p$ | $R_{exp}$ |
|---|---|---|---|---|---|---|---|---|
| P-6 (Hexa) | 0.3 | 8.2463 | 8.2463 | 3.1363 | 184.7003 | 3.70 | 7.81 | 5.65 |
| C 1 2/c 1 (Mono) | 99.7 | 5.1928 | 8.9641 | 10.3741 | 482.6791 | | | |

Figure 2:
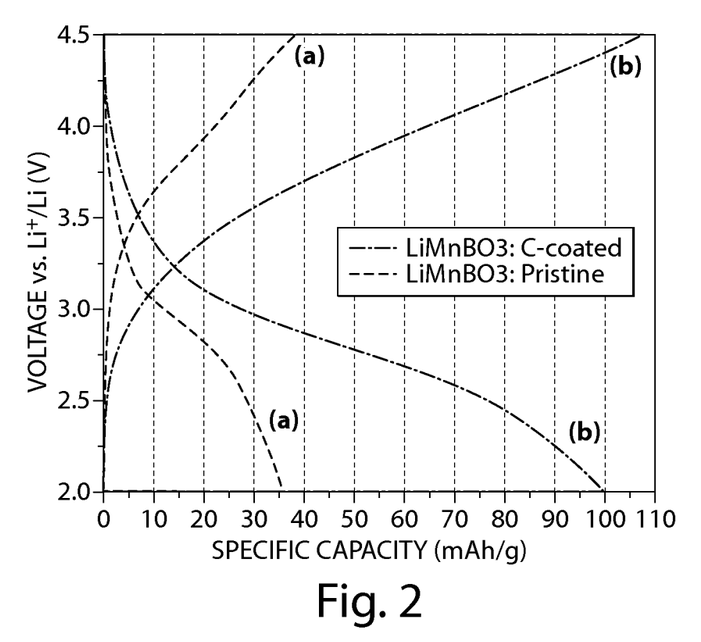
FIG. 2 illustrates charge and discharge curves for a material in accordance with another embodiment of the invention.
Figure 5:
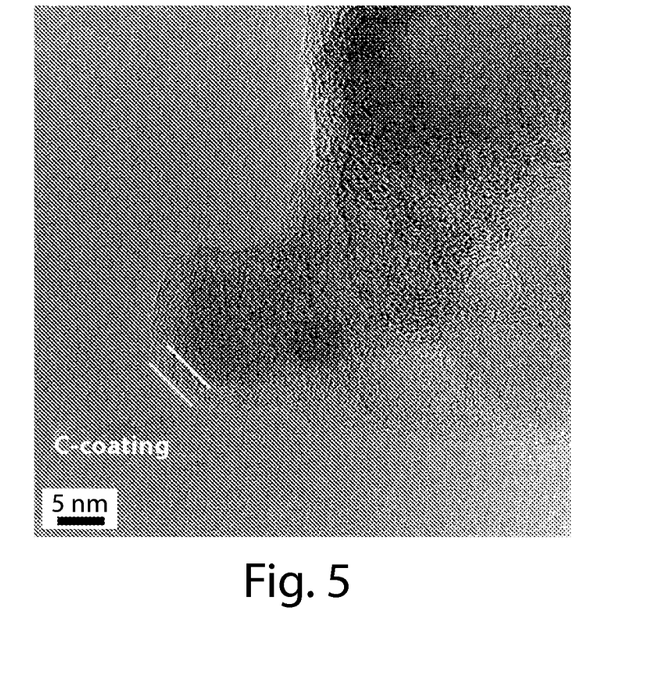
FIG. 5 is an HRTEM image of carbon-coated LiMnBO$_3$ in accordance with one embodiment of the invention.

The theoretical capacity of LiMnBO$_3$ is 222 mAh/g, assuming that all of the lithium ions can be extracted. FIG. 2 shows the charge and discharge capacity from the 2$^{nd}$ to the 4$^{th}$ cycle measured at a C/20 rate for a sample prepared according to one embodiment of the present invention. The voltage window was 2.0 V to 4.5 V, and the electrode loading was 1.3 mg. The reference dashed line shows the performance without carbon coating. As shown in FIG. 2, the second discharge capacity was around 96 mAh/g at a C/20 rate within the 2.0 V to 4.5 V window, which was almost half of the theoretical capacity, and was surprisingly better than LiMnBO$_3$ in the hexagonal crystal structure. FIG. 2 also shows the effect of carbon-coating. The carbon coating may be useful to create good percolation in the electron conduction path, so that polarization can be reduced and the capacities can be increased in both charging and discharging cycles. This figure also shows the effect of carbon-coating, and an HRTEM image of carbon-coated LiMnBO$_3$ is shown in FIG. 5.

Figure 3:
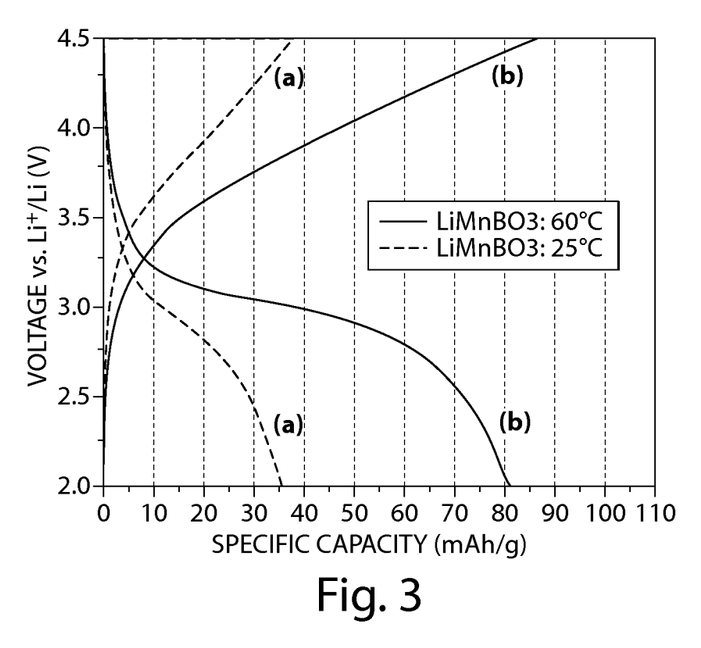
FIG. 3 illustrates charge and discharge curves for a material in accordance with yet another embodiment of the invention.

FIG. 3 shows the charge and discharge capacity from the 1$^{st}$ to the 3$^{rd}$ cycle measured at a C/20 rate at 60° C. (solid line). The voltage window was 2.0 V to 4.5 V and the electrode loading was 1.8 mg. The reference dashed line shows the performance in room temperature, which can be used to see the effect of temperature on electrochemical performance. This shows that the material is diffusion-limited. Note that the tested cells in FIG. 3 were identical and the electrode was made by solely manual mixing without carbon-coating.

This shows a surprising improvement compared to previous reports on LiMnBO$_3$, which were unsuccessful in extracting any significant amount of Li from the material. Moreover, further improvement of capacity may be achieved by reducing particle size. Accordingly, this example shows that monoclinic LiMnBO$_3$ has promise as a new cathode material for lithium ion batteries.

Figure 6:
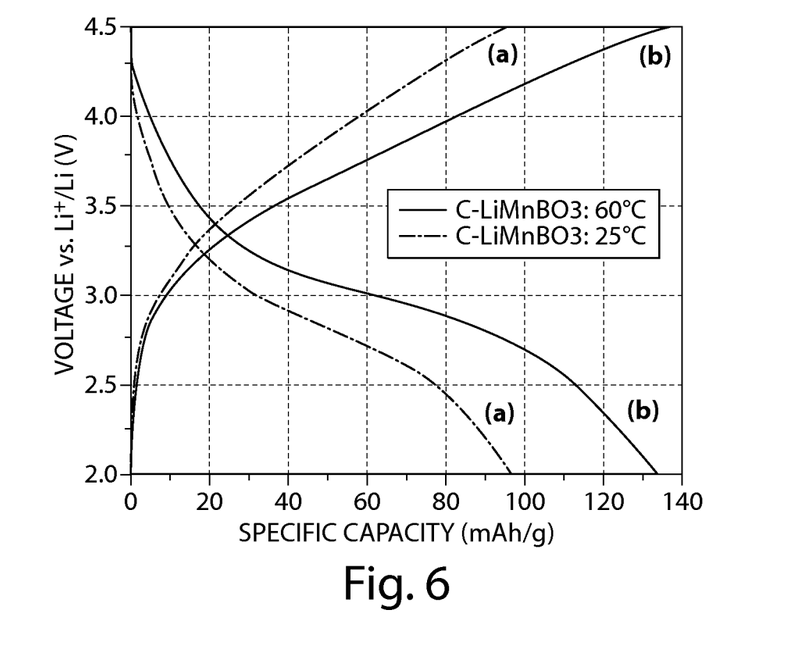
FIG. 6 shows charge and discharge capacities of carbon-coated LiMnBO$_3$ at certain temperatures, in various embodiments of the invention.

FIGS. 3 and 6 also show the effect of temperature on electrochemical performance. In particular, FIG. 3 shows the second charge and discharge capacities of pristine LiMnBO$_3$ measured at a C/20 rate at (a) 25° C. and (b) 60° C. FIG. 6 shows the second charge and discharge capacities of carbon-coated LiMnBO$_3$ measured at a C/20 rate at (a) 25° C. and (b) 60° C. The voltage window in each case was 2.0 V to 4.5 V. It appeared that more lithium can be extracted from and inserted into the cathode at 60° C. than at 25° C. Also, the cell at 60° C. showed less polarization than that at 25° C. in both pristine and carbon-coated LiMnBO$_3$. Enhanced kinetics at a higher temperature may be related to Li diffusion, which is a thermally activated process. If the material is intrinsically transport limited (electron or Li$^+$), improvement of its electrochemical properties can be achieved by reducing the diffusion length.

Table 2 summarizes the computed properties for these two polymorphs, monoclinic (C12/c1) and hexagonal (P-6). The energy densities were much higher than the one for LiFePO$_4$, both volumetrically and gravimetrically (the LiFePO$_4$ energy density is 600 W h/kg or 2000 W h/l). These also operate in a voltage window compatible with current electrolyte technology. While the C12/c1 phase has a slightly lower voltage resulting in lower energy density, it shows a lower driving force for decomposition of the delithiated structure to its equilibrium products (i.e. a smaller distance to the hull for the delithiated state).

TABLE 2

| Phase | Voltage (V) | Grav. Energy Density (Wh/kg) | Vol. Energy Density (Wh/L) | Theoretical Capacity (mAh/g) | Lithiated distance to hull$^a$ (meV/at) | Delith. Distance to hull$^a$ (meV/at) | Volume change$^b$ (%) |
|---|---|---|---|---|---|---|---|
| P-6 | 4.11 | 912 | 2922 | 222 | 0 | 216 | 0.6 |
| C12/c1 | 3.74 | 822 | 2635 | 222 | 4 | 140 | 2.5 |

$^a$Distance to hull stands for difference in energy from the computed ground state.
$^b$Volume change is taken as a percentage of the lithiated state volume.

The two crystal structures were significantly different, as shown in FIG. 4, but were energetically very close. FIG. 4A is a schematic diagram showing the hexagonal crystal structure (P-6) for LiMnBO$_3$, while FIG. 4B (C21/c1) shows the monoclinic crystal structure for this compound. In these figures, 10 represents lithium, 13 is boron, 15 is oxygen, and 18 is manganese. Only 5 meV/at separates the two polymorphs energetically. This is within the range of DFT errors, entropy effects, and/or kinetic effects, thereby showing that the two polymorphs could indeed be both synthesized.

As the safety of the cathode material is an important concern for certain battery applications, these experiments also compared the minimum oxygen chemical potential needed for the delithiated cathode MnBO$_3$ to liberate oxygen gas. This minimum oxygen chemical potential is indeed a good indicator for the cathode thermal stability. On a scale where air at 298 K is defined as the zero oxygen chemical potential, MnBO$_3$ was computed to "blow off" oxygen at −0.39 eV/at. This number can be compared to LiCoO$_2$, a familiar cathode with well known safety problems lying at 0.294 eV/at, and at an extremely safe material such as LiFePO$_4$ blowing off oxygen at −1.6 eV/at.

Additionally, analysis of the Li diffusion in the C12/c1 structure showed that Li ions diffuse through the 1-D channel along c-axis in the structure. The ab initio calculated diffusion barriers were about 395 meV in the delithiated state and 509 meV in the lithiated state, which is comparable to the value of other cathode materials.

Example of synthesis. 1.4778 g of Li$_2$CO$_3$, 7.1596 g of MnC$_2$O$_4$.2H$_2$O, and 2.4732 g of H$_3$BO$_3$ were weighed and dispersed into acetone in a Nalgene container. The precursors were ballmilled for 72 hours then dried on a 75° C. hot plate in the air overnight. The mixture was pressed into a disc-shaped pellet and then calcined 350° C. for 10 hours under an argon atmosphere. The calcined disc was thoroughly ground manually and pressed into a disc-shape again for sintering. It was sintered at 550° C. for 10 hours under an argon atmosphere.

Example of optimization. The sintered pellet was ground manually. To make an electrode, the material was mixed with carbon black and PTFE. In the process of mixing, the weight ratio between the active material and carbon black was varied. Different mixing methods such as manual mixing and high energy ballmilling were utilized for further optimization. Among attempted weight ratios, 16:3 (the active material: carbon black) ratio by high energy ballmilling led to the best performance. The amount of PTFE was fixed to be 5% of the total electrode in weight and mixed only manually. One example composition of a 1.8 mg electrode was 1.44 mg of the active material, 0.27 mg of carbon black, and 0.09 mg of PTFE.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical device, comprising:
a compound including at least 20% by weight $Li_xMn_y(BO_3)$ exhibiting a monoclinic crystal system, wherein x and y are each greater than 0.

2. The electrochemical device of claim 1, wherein x is between about 0.9 and about 1.1.

3. The electrochemical device of claim 1, wherein y is between about 0.9 and about 1.1.

4. The electrochemical device of claim 1, wherein x is about 1 and y is about 1.

5. The electrochemical device of claim 1, wherein the $Li_xMn_y(BO_3)$ is present within an electrode within the electrochemical device.

6. The electrochemical device of claim 5, wherein at least 50 wt % of the electrode is $Li_xMn_y(BO_3)$.

7. The electrochemical device of claim 6, wherein at least 75 wt % of the electrode is $Li_xMn_y(BO_3)$.

8. The electrochemical device of claim 5, wherein the $Li_xMn_y(BO_3)$ is present within the electrode as $LiMn(BO_3)$.

9. The electrochemical device of claim 1, wherein at least about 20 wt % of the $Li_xMn_y(BO_3)$ exhibits the monoclinic crystal system.

10. The electrochemical device of claim 9, wherein at least about 50 wt % of the $Li_xMn_y(BO_3)$ within the electrochemical device exhibits the monoclinic crystal system.

11. The electrochemical device of claim 10, wherein at least about 80 wt % of the $Li_xMn_y(BO_3)$ within the electrochemical device exhibits the monoclinic crystal system.

12. The electrochemical device of claim 11, wherein at least about 95 wt % of the $Li_xMn_y(BO_3)$ within the electrochemical device exhibits the monoclinic crystal system.

13. The electrochemical device of claim 1, wherein the $Li_xMn_y(BO_3)$ exhibits an energy storage capacity of at least about 96 mA h/g when the $Li_xMn_y(BO_3)$ is charged to 4.5 V and discharged to 2.0 V at a current rate of at least 11.1 mA/g.

14. The electrochemical device of claim 1, wherein the electrode further comprises binder.

15. The electrochemical device of claim 14, wherein the binder comprises polytetrafluoroethylene.

16. The electrochemical device of claim 14, wherein the binder comprises polyvinylidenefluoride.

17. The electrochemical device of claim 1, wherein the electrode further comprises carbon.

18. The electrochemical device of claim 1, wherein the $Li_xMn_y(BO_3)$ is present as $LiMn(BO_3)$.

19. An electrochemical device, comprising:
a compound including at least 20% by weight $Li_xMn_yA_zBO_3$ having a monoclinic crystal system, wherein x is greater than 0, y is greater than 0, z is no more than about 0.2, and A when present is one or more of Fe, Mg, Cu, Zn, Co, Ni, or Ca.

20. The electrochemical device of claim 19, wherein z is 0.

21. The electrochemical device of claim 19, wherein the $Li_xMn_yA_zBO_3$ consists essentially of $Li_xMn_y(BO_3)$.

22. The electrochemical device of claim 19, wherein A is Fe.

23. The electrochemical device of claim 19, wherein x is about 1.

24. The electrochemical device of claim 19, wherein z is about 0.

25. The electrochemical device of claim 19, wherein y+z is between about 0.5 and about 1.5.

26. The electrochemical device of claim 1, wherein the compound includes at least 70% by weight $Li_xMn_y(BO_3)$ exhibiting the monoclinic crystal system.

27. The electrochemical device of claim 1, wherein the compound includes at least 90% by weight $Li_xMn_y(BO_3)$ exhibiting the monoclinic crystal system.

28. The electrochemical device of claim 19, wherein the compound includes at least 70% by weight $Li_xMn_y(BO_3)$ exhibiting the monoclinic crystal system.

29. The electrochemical device of claim 19, wherein the compound includes at least 90% by weight $Li_xMn_y(BO_3)$ exhibiting the monoclinic crystal system.

* * * * *